Oct. 28, 1924.    1,513,373
G. J. CORPORON
DISPENSING APPARATUS
Filed Feb. 2, 1922
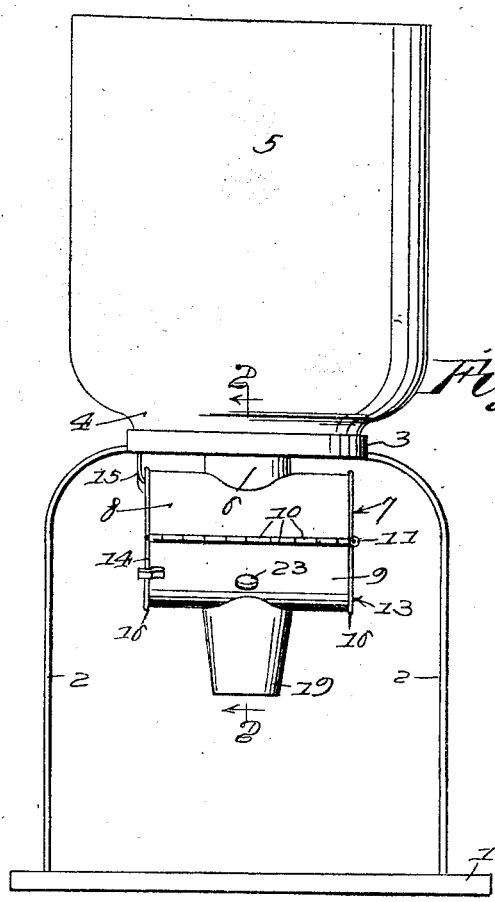
Fig.1.
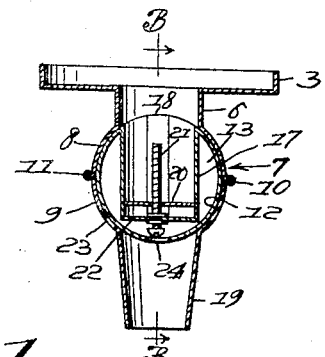
Fig.2.
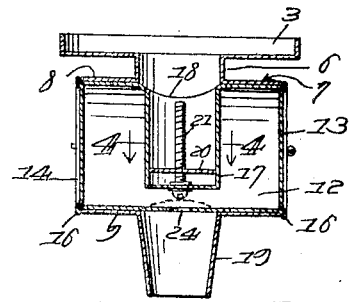
Fig.3.
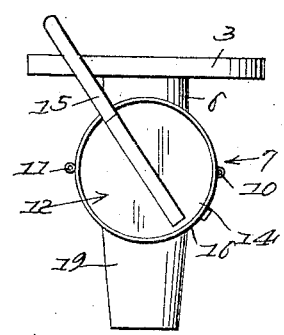
Fig.4.
Fig.5.
Inventor
George J. Corporon,
By William W. Deane
his Attorney Patented Oct. 28, 1924.

1,513,373

UNITED STATES PATENT OFFICE.

GEORGE JOSEPH CORPORON, OF AMESBURY, MASSACHUSETTS.

DISPENSING APPARATUS.

Application filed February 2, 1922. Serial No. 533,528.

*To all whom it may concern:*

Be it known that I, GEORGE JOSEPH CORPORON, citizen of the United States, residing at Amesbury, in the county of Essex and State of Massachusetts, have invented certain new and useful Improvements in Dispensing Apparatus, of which the following is a specification, reference being had therein to the accompanying drawing.

This invention relates to improvements in dispensing mechanism and more particularly to a dispensing apparatus designed specifically for delivering measured quantities of salted nuts.

The primary object of the present invention is to furnish an apparatus of simple and inexpensive construction, and one which will not easily get out of order.

Another object of the invention is to provide means for adjusting or varying the size of the measuring vessel, so that said vessel may be regulated to dispense various quantities of material without entering the casing in which the measuring vessel is housed.

A further feature of the invention resides in an improved casing which may be readily disassembled for the purpose of cleaning. This feature is quite important in machines used in dispensing salted nuts, as the oil from the nuts gathers on the interior of the casing and accumulates the salt, so that the internal mechanism soon clogs and becomes unsanitary.

With the foregoing objects outlined and with other objects in view which will appear as the description proceeds, the invention consists in the novel features hereinafter described in detail, illustrated in the accompanying drawing and more particularly pointed out in the appended claims.

Referring to the drawing:

Figure 1 is a front view of my improved apparatus.

Fig. 2 is a transverse vertical sectional view of a portion of the same taken on line 2—2 of Fig. 1.

Fig. 3 is a vertical longitudinal sectional view of a portion of the apparatus taken on line 3—3 of Fig. 2.

Fig. 4 is a horizontal sectional view of a detail taken on line 4—4 of Fig. 3.

Fig. 5 is an end view of the measuring casing of the apparatus.

In the drawing, 1 designates a base of any suitable construction from which rises the posts or brackets 2 that support at their upper ends a cup 3 which embraces the neck 4 of an inverted storage vessel or reservoir 5.

The vessel 5 is preferably formed of glass in order that it may be readily cleaned, and measured quantities of material such as salted nuts are adapted to be dispensed from this vessel.

To permit measured quantities of material to be dispensed from the vessel, the cup 3 is provided with a depending neck 6 preferably of cylindrical cross-section, and this neck carries the casing 7, formed of the upper half sleeve 8 and a lower half sleeve 9. The edges of these half sleeves are provided with aligned collars or bearings 10 which receive pins 11 adapted for holding the two halves of the casing together. It will be seen that the withdrawal of the pins 11 will permit the lower half 9 of the casing to be detached so that the interior of the casing may be readily cleaned.

Rotatably mounted in the casing 7 is a cylinder 12 having heads 13 and 14, the latter being provided with an operating handle 15. It will be noted that the edges 16 of the heads 13 and 14 project outwardly over the edges of the ends of the casing 7 in order to prevent endwise movement of the cylinder 12.

The cylinder 12 has a measuring receptacle 17 of substantially cylindrical shape which projects inwardly from one side of the cylinder and has its axis arranged perpendicularly to the axis of the cylinder. The open end 18 of the vessel 17 is adapted when the same registers with the neck 6, to permit the material from the reservoir 5 to be discharged into the measuring receptacle 17, and when the vessel 17 is filled, the handle 15 may be turned to bring the open end 18 into registration with the spout 19 depending from the lower half 9 of the casing 7.

For the purpose of varying the capacity of the vessel 17, a piston 20 is arranged in said receptacle and this piston may be adjusted by means of a screw 21 which has its head rotatably mounted in the bottom 22 of the receptacle and has its stem engaging a threaded aperture in the piston 20. In order to permit the screw to be turned without withdrawing the receptacle 17 or the cylinder 12 from the casing 7, the casing is provided with an aperture 23 that is adapted to align with a similar aperture 24 formed in the cylinder 12. When the apertures 23 and 24 are in registration, a suitable tool such as a screw-driver may be inserted into the cylinder 12 for the purpose of turning the screw 21.

In order to prevent the piston from turning with the screw, one side wall of the vessel 17 is flattened as shown at 25 and cooperates with a similar flattened portion on the piston 20.

From the foregoing it will be understood that the material to be dispended is placed in the reservoir 5 and that measured quantities may be dispensed from the same by turning the handle 15 in the proper directions. When it is desired to vary the amount of material dispensed, the apertures 23, 24 are brought into alignment by turning the handle 15 and then the screw 21 can be adjusted to move the piston in one direction or another.

When it is desired to clean the apparatus, the pins 11 may be withdrawn and then the cylinder 12 may be detached from the casing 7. If desired the vessel 17 may also be cleaned by turning the screw 21 to remove the piston 20 from the receptacle 17.

From the foregoing, I believe that the construction, operation and advantages of the invention may be readily understood and I am aware that various changes may be made in the details disclosed without departing from the spirit of the invention as expressed in the following claims.

What I claim and desired to secure by Letters-Patent is:

1. A dispensing apparatus including a reservoir to contain the material to be dispensed, a casing connected to said reservoir and including a cylindrical portion formed of two half sleeves having their edges detachably connected together, a cylinder arranged in said casing and provided with outwardly extending edge portions engaging the edges of the ends of the cylindrical portion of said casing, a measuring receptacle carried by said cylinder, and a discharge conduit carried by said casing and adapted to permit the measuring receptacle to discharge its contents.

2. A dispensing apparatus including a reservoir to contain the material to be dispensed, a casing having an inlet connected to said reservoir and including a cylindrical portion formed of two half sleeves having their edges detachably connected together, an outlet connected to one of said half sleeves, a rotatable cylinder arranged in said casing and provided with outwardly extending edge portions engaging the edges of the ends of the cylindrical portion of said casing, the wall of said cylinder snugly engaging the cylindrical portion of said casing, a measuring receptacle carried by said cylinder, a piston arranged in the receptacle and movable in the same to adjust the capacity thereof, and a screw rotatably mounted in said receptacle and engaging said piston, said casing being provided at one side with an aperture and the cylinder having an aperture to register with the aperture of the casing, said screw having its head arranged adjacent to the aperture in the cylinder to permit said piston to be adjusted by inserting a tool through said apertures when the apertures are in alignment.

In testimony whereof I hereunto affix my signature in the presence of two witnesses.

GEORGE JOSEPH CORPORON.

Witnesses:
JAMES E. McGRATH,
CARL C. CHIPMAN.